(12) United States Patent
Lee

(10) Patent No.: US 8,325,389 B2
(45) Date of Patent: Dec. 4, 2012

(54) IMAGE READING APPARATUS AND METHOD OF CONTROLLING THE SAME

(75) Inventor: Yong Duk Lee, Gunpo-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 627 days.

(21) Appl. No.: 12/108,651

(22) Filed: Apr. 24, 2008

(65) Prior Publication Data

US 2009/0027742 A1    Jan. 29, 2009

(30) Foreign Application Priority Data

Jul. 24, 2007    (KR) .................. 10-2007-0074166

(51) Int. Cl.
*H04N 1/04* (2006.01)
*H04N 1/40* (2006.01)
(52) U.S. Cl. ............... 358/448; 358/497; 358/498
(58) Field of Classification Search .............. 358/497, 358/498, 448
See application file for complete search history.

(56) References Cited

U.S. PATENT DOCUMENTS

2007/0115516 A1*    5/2007    Uku .................. 358/498

FOREIGN PATENT DOCUMENTS

| JP | 2002-354192 | 12/2002 |
| JP | 2006-148294 | 6/2006 |
| JP | 2007-143014 | 6/2007 |

OTHER PUBLICATIONS

Chinese Search Report issued Feb. 5, 2010 in CN Application No. 200810107805.0.
Japanese Office Action dated Jun. 26, 2012 issued in JP Application No. 2008-142448.

* cited by examiner

*Primary Examiner* — Charlotte M Baker
*Assistant Examiner* — Justin Katzwhite
(74) *Attorney, Agent, or Firm* — Stanzione & Kim, LLP

(57) ABSTRACT

An image reading apparatus to automatically determine whether first and second reading units, which are opposed to each other with a document interposed therebetween, are normally operated and a method of controlling the same includes a duplex path to guide the document, which is read by the first reading unit and the second reading unit, to be transported to the first reading unit and the second reading unit again in a state in which the first side and the second side of the document are reversed. The document is subjected to a primary reading operation using the first reading unit and the second reading unit, and the document, which was subjected to the primary reading operation, is then guided via the duplex path and passes through the first reading unit and the second reading unit. At this time, the document is subjected to a secondary reading operation using the first reading unit and the second reading unit, and a control unit compares image information obtained by the first reading unit and the second reading unit in the primary reading operation with image information obtained by the first reading unit and the second reading unit in the secondary reading operation. The control unit also determines whether the first reading unit and the second reading unit are normally operated.

20 Claims, 5 Drawing Sheets

IMAGE READING APPARATUS AND METHOD OF CONTROLLING THE SAME

CROSS-REFERENCE TO RELATED APPLICATIONS

This application claims priority under 35 U.S.C. §119(a) from Korean Patent Application No. 2007-74166, filed on Jul. 24, 2007 in the Korean Intellectual Property Office, the disclosure of which is incorporated herein in its entirety by reference.

BACKGROUND OF THE INVENTION

1. Field of the Invention

The present general inventive concept relates to an image reading apparatus, and, more particularly, to an image reading apparatus capable of reading both sides of a document and a method of controlling the same.

2. Description of the Related Art

An image reading apparatus reads image information recorded on a document and is mounted in a machine such as a scanner, a digital copier or a multi-function machine.

A method of reading both sides of a document in an image reading apparatus may be classified into two methods. There is a method of reading a first side of a transported document using a reading unit, changing a transport direction of the document via a document direction changing device, reversing the first side and a second side of the document via a duplex path, and reading the second side of the document (hereinafter, referred to as a "first method", for convenience of description). Such a method is advantageous in that the both sides of the document can be read using one reading unit, but is disadvantageous in an amount of time required to read the both sides of the document.

There is a method of reading both sides of a document by mounting a first reading unit to read a first side of the document and a second reading unit to read a second side of the document to be opposed to each other (hereinafter, referred to as a "second method", for convenience of description). Such a method is advantageous in that the both sides of the document can be simultaneously read without unnecessarily circulating the document and thus a both-side reading operation can be performed with a high speed. However, if any one of the first reading unit and the second reading unit is out of order, the both-side reading operation cannot be performed.

In order to solve such problems, Japanese Unexamined Patent Application Publication No. 2006-148294 relates to an image reading apparatus employing a combination of the first method and the second method. That is, the disclosed image reading apparatus includes two reading units (a first reading unit and a second reading unit) and a document reversing device (reverse transporting mechanism) such that the second method is applied without using the reverse transporting mechanism when the first reading unit and the second reading unit are normally operated and both sides of a document are read using a reading unit, which is normally operated, and the reverse transporting mechanism (the first method is applied) when any one of the first reading unit and the second reading unit is not normally operated.

However, in the conventional image reading apparatus, automatically determining an abnormal state in which at least one of the reading units is not normally operated is not accomplished. Accordingly, rapidly coping with a malfunction or failure of the apparatus is difficult for a user.

SUMMARY OF THE INVENTION

The present general inventive concept provides an image reading apparatus to automatically determine whether a reading unit is normally operated and a method of controlling the same.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image reading apparatus including first and second reading units to respectively read first and second sides of a transported document, a duplex path to guide the document, which is read by the first reading unit and the second reading unit, to be transported to the first reading unit and the second reading unit again in a state in which the first side and the second side of the document are reversed, and a control unit to compare image information of the first and second sides of the document read by the first reading unit with image information of the first and second sides of the document read by the second reading unit.

The control unit may determine that at least one of the first reading unit and the second reading unit is not normally operated if the image information of the first side of the document obtained by the first reading unit is not identical to the image information of the first side of the document obtained by the second reading unit in a predetermined error range.

The control unit may determine that at least one of the first reading unit and the second reading unit is not normally operated if the image information of the second side of the document obtained by the first reading unit is not identical to the image information of the second side of the document obtained by the second reading unit in a predetermined error range.

If a determination is made that the first reading unit or the second reading unit is not normally operated, a both-side reading operation may be performed using the duplex path.

The image reading apparatus may further include a display unit to display an abnormal state of the first reading unit or the second reading unit if a determination is made that the first reading unit or the second reading unit is not normally operated.

The foregoing and/or other aspects and utilities of the general inventive concept may also be achieved by providing a method of controlling an image reading apparatus including first and second reading units to respectively read first and second sides of a transported document, and a duplex path to guide the document, which is read by the first reading unit and the second reading unit, to be transported to the first reading unit and the second reading unit again in a state in which the first side and the second side of the document are reversed, the method including performing a primary reading operation with respect to the document using the first reading unit and the second reading unit, circulating the document via the duplex path, performing a secondary reading operation with respect to the document using the first reading unit and the second reading unit, and comparing image information obtained by the first reading unit and the second reading unit in the primary reading operation with image information obtained by the first reading unit and the second reading unit in the secondary reading operation and determining whether the first reading unit and the second reading unit are normally operated.

If the image information of the first side of the document obtained by the first reading unit in the primary reading operation is not identical to the image information of the first side of the document obtained by the second reading unit in the secondary reading operation, a determination may be made that at least one of the first reading unit and the second reading unit is not normally operated.

If the image information of the second side of the document obtained by the second reading unit in the primary reading operation is not identical to the image information of the second side of the document obtained by the first reading unit in the secondary reading operation, a determination may be made that at least one of the first reading unit and the second reading unit is not normally operated.

If a determination is made that the first reading unit or the second reading unit is not normally operated, a both-side reading operation may be performed using the duplex path.

The method may further include displaying information on an abnormal state if a determination is made that the first reading unit or the second reading unit is not normally operated, determining a reading unit selected by a user to be a reading unit which is normally operated, and switching a both-side reading mode using both the first reading unit and the second reading unit to a both-side reading mode using the duplex path.

The foregoing and/or other aspects and utilities of the general inventive concept may also be achieved by providing a method of controlling an image reading apparatus including a first reading unit and a second reading unit, the method including receiving a reading command from a user, inquiring to the user whether a malfunction detecting process of determining whether the first reading unit and the second reading unit are normally operated is performed, receiving a command indicating whether the malfunction detecting process is performed, and controlling the first reading unit and the second reading unit to read a document.

The foregoing and/or other aspects and utilities of the general inventive concept may also be achieved by providing a method of controlling an image reading apparatus including first and second reading units to respectively read first and second sides of a document, and a duplex path to guide the document, which is read by the first reading unit and the second reading unit, to be transported to the first reading unit and the second reading unit again in a state in which the first side and the second side of the document are reversed, the method including receiving a command indicating whether a malfunction detecting process of determining whether the first reading unit and the second reading unit are normally operated is performed, respectively reading the first side and the second side of the document using the first reading unit and the second reading unit, and circulating the document via the duplex path and respectively reading the second side and the first side of the document using the first reading unit and the second reading unit.

The foregoing and/or other aspects and utilities of the general inventive concept may also be achieved by providing an image forming apparatus including a first reading unit to read at least one side of a document, a second reading unit to read at least an other side of the document, a first reading mode to use the first reading unit to read the one side of the document and the second reading unit to read the other side of the document, a second reading mode to use one of the first and second reading units to read both sides of the document, and a control unit to automatically detect a respective state of the first and second reading units and to select one of the first reading mode and the second reading mode based on the respective state detected.

The first reading mode may be selected by the control unit when a normal state of the first and second reading units is detected, and the second reading mode may be selected by the control unit when an abnormal state of one of the first and second reading units is detected.

The one of the first and second reading units to read the both sides of the document in the second reading mode may be detected to be in a normal state.

The controller may detect the respective state of the first and second reading units by comparing image information of the both sides of the document read by the first reading unit with image information of the both sides of the document read by the second reading unit.

The foregoing and/or other aspects and utilities of the general inventive concept may also be achieved by providing an image forming method of an image forming apparatus having a first reading mode to read both sides of a document with a plurality of reading units and a second reading mode to read the both sides of the document with one reading unit, the image forming method including automatically detecting a respective state of the plurality of reading units, and selecting one of the first reading mode and the second reading mode based on the respective state of the reading units detected.

Detecting the respective state of the first and second reading units may include comparing image information of the both sides of the document read by one of the reading units with image information of the both sides of the document read by an other of the reading units.

The foregoing and/or other aspects and utilities of the general inventive concept may also be achieved by providing a computer-readable recording medium having embodied thereon a computer program to execute a method, wherein the method includes receiving a reading command from a user, inquiring to the user whether a malfunction detecting process of determining whether a first reading unit and a second reading unit are normally operated is performed, receiving a command indicating whether the malfunction detecting process is performed, and controlling the first reading unit and the second reading unit to read a document.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
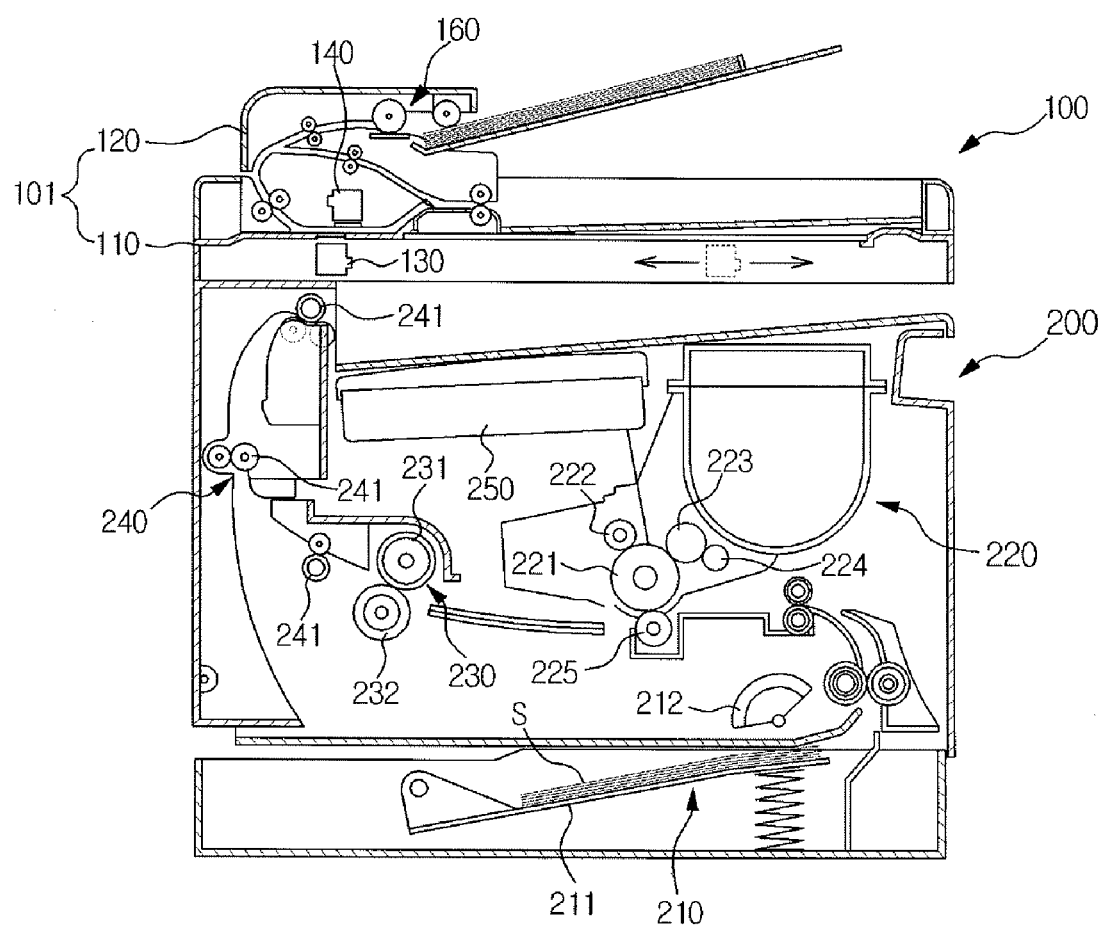
FIG. 1 is a view illustrating a configuration of a multi-function machine having an image reading apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

Figure 2:
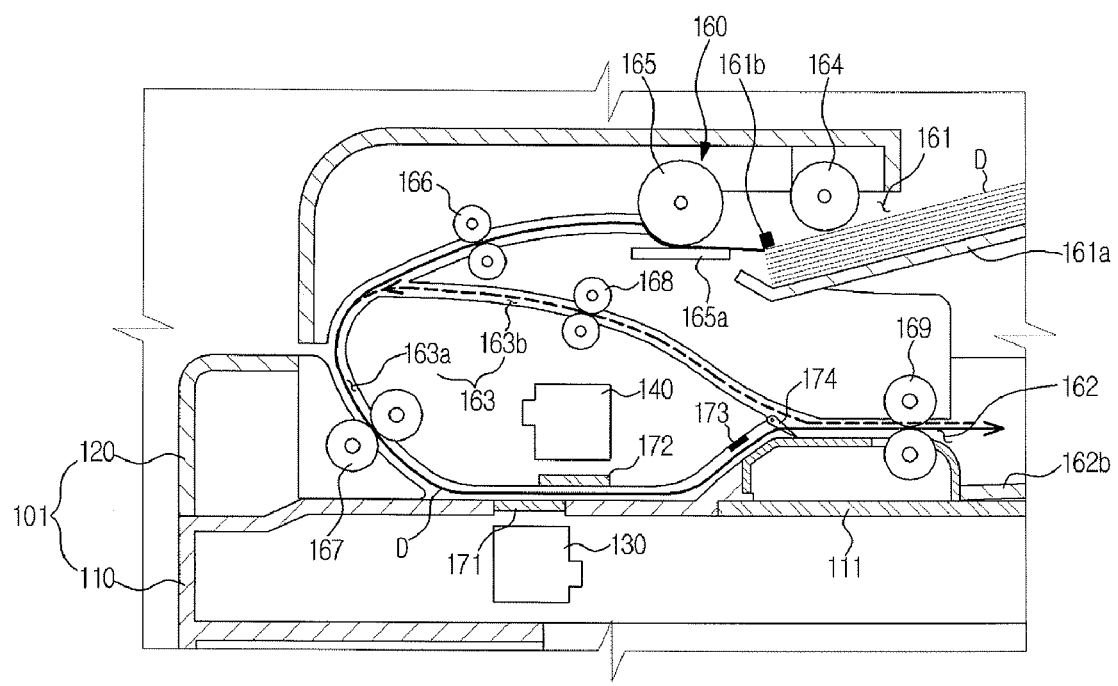
FIG. 2 is a view illustrating a configuration of the image reading apparatus according to an embodiment of the present general inventive concept.
Figure 3:
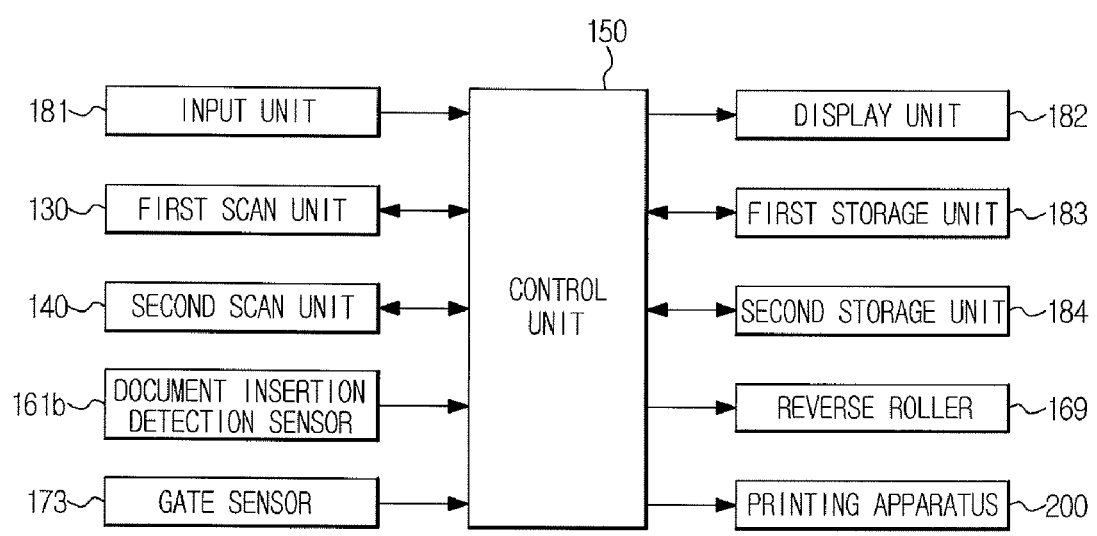
FIG. 3 is a block diagram illustrating the image reading apparatus according to an embodiment of the present general inventive concept.

FIG. 1 is a view illustrating a configuration of a multi-function machine having an image reading apparatus according to an embodiment of the present general inventive concept, FIG. 2 is a view illustrating a configuration of the image reading apparatus according to an embodiment of the present general inventive concept, and FIG. 3 is a block diagram illustrating the image reading apparatus according to an embodiment of the present general inventive concept.

As illustrated in FIG. 1, the multi-function machine includes an image reading apparatus 100 to read an image recorded on a document and a printing apparatus 200 to print an image on a document.

The printing apparatus 200 prints an image according to a signal input from the image reading apparatus 100 or input from an external apparatus such as a personal computer (PC). The printing apparatus 200 includes a document feed unit 210 to feed a document S which is a printing medium, a development unit 220 to develop an image on the document, a fixing unit 230 to apply heat and pressure to the document and fix the developed image to the document, and an ejection unit 240 to eject the document on which the image is printed.

The document feed unit 210 includes a document tray 211 on which documents S are loaded and a document pickup roller 212 to pick up the documents S loaded on the document tray 211 one by one and move the documents toward the development unit 220.

The development unit 220 includes a photosensitive drum 221 on which an electrostatic latent image is formed by an exposure unit 250, a charging roller 222 to charge the photosensitive drum 221, a development roller 223 to develop the electrostatic latent image formed on the photosensitive drum 221 to a toner image, a feed roller 224 to feed a toner to the development roller 223, and a transfer roller 225 to pressurize a document toward the photosensitive drum 221 so as to transfer the toner image developed on the photosensitive drum 221 onto the document.

The fixing unit 230 includes a heating roller 231 having a heating source to heat the toner image transferred onto the document and a pressurization roller 232 which is mounted so as to be opposed to the heating roller 231 and maintains a predetermined fixing pressure with the heating roller 231.

The ejection unit 240 includes a series of ejection rollers 241 which are sequentially mounted so as to eject the document passing through the fixing unit 230.

As illustrated in FIGS. 2 and 3, the image reading apparatus 100 according to embodiments of the present general inventive concept includes a reading apparatus main body 101 including a reading frame 110 and a cover 120, first and second reading units 130 and 140 to irradiate light onto a document D and read image information, and a control unit 150 to control an entire operation of the image reading apparatus 100 according to an input signal of a user and a predetermined program.

The first reading unit 130 and the second reading unit 140 irradiate light onto the document D, detect the light reflected from the document, convert an amount of light into an electrical signal, and send the electrical signal to the control unit 150. The first reading unit 130 and the second reading unit 140 face each other with a document transporting path 163 interposed therebetween. More particularly, the first reading unit 130 is located below the document D passing through the document transporting path 163 to read image information from a first side of the document, and the second reading unit 140 is located above the document D passing through the document transporting path 163 to read image information from a second side of the document. Accordingly, simultaneously reading both sides of the document passing through the document transporting path 163 using the first reading unit 130 and the second reading unit 140 is accomplished. Hereinafter, a mode of reading both sides of the document using both the first reading unit 130 and the second reading unit 140 is referred to as a first both-side reading mode.

The cover 120 is rotatably coupled to the reading frame 110 so as to open and close the upper surface of the reading frame 110. The second reading unit 140 and an automatic document feeder (ADF) 160, to automatically feed the document such that a reading operation is continuously performed, are mounted inside the cover 120.

The automatic document feeder 160 includes a document insertion port 161 through which a document to be read is inserted, a document ejection port 162 through which the read document is ejected, the document transporting path 163 which is formed inside the cover 120 so as to transport the document, and rollers which are mounted on the document transporting path 163 so as to transport the document.

The document insertion port 161 is formed at one side of the cover 120 and the document ejection port 162 is formed below the document insertion port 161. A document feed tray 161a on which the documents D to be transported by the automatic document feeder 160 are loaded and a document insertion detection sensor 161b to detect whether a document is inserted and outputs the detected result to the control unit 150 are provided in a vicinity of the document insertion port 161. A document ejection tray 162b, on which the documents ejected after the reading operation is completed are loaded, is provided in a vicinity of the document ejection port 162.

The document transporting path 163 has a C-shaped reading path 163a of which one end is connected to the document feed tray 161a via the document insertion port 161 and an other end is connected to the document ejection tray 162b via the document ejection port 162. A first ADF glass 171 and a second ADF glass 172 are sequentially arranged on the reading path 163a such that the first reading unit 130 and the second reading unit 140 can read image information recorded on the document D passing through the reading path 163a. The first ADF glass 171 is mounted on the reading frame 110 at a position corresponding to the first reading unit 130 and the second ADF glass 172 is mounted on the cover 120 at a position corresponding to the second reading unit 140.

The document transporting path 163 has a duplex path 163b of which one end is connected to the reading path 163a at a downstream side of the second reading unit 140 and the other end is connected to the reading path 163a at an upstream side of the first reading unit 130. The duplex path 163b guides the document, which was subjected to a primary reading operation using the first reading unit 130 and the second reading unit 140, to be transported to the first reading unit 130 and the second reading unit 140 again in a state in which the first and second side of the document are reversed. In an embodiment of the present general inventive concept, the duplex path 163b is used when a determination is made whether the first reading unit 130 and the second reading unit 140 are normally operated and is used when the both-side reading operation is performed using only any one of the first reading unit 130 and the second reading unit 140. Hereinafter, a mode of reading the both sides of the document using the duplex path 163b is referred to as a second both-side reading mode.

The document transporting rollers include a document pickup roller 164 to pick up the document D loaded on the document feed tray 161a, first to third transporting rollers 165, 166 and 167 to transport the document picked up by the document pickup roller 164 on the reading path 163a, a duplex roller 168 to transport the document on the duplex path 163b, and a reverse roller 169 to reverse the document passing through the reading path 163a and transport the document to the duplex path 163b. Among the transporting rollers, the first transporting roller 165, which is provided closest to the document pickup roller 164, separates the documents picked up by the document pickup roller 164 one by one. In order to separate the documents, a friction pad 165a is provided so as to be opposed to the first transporting roller 165.

The reverse roller 169 transports the document on the reading path 163a toward the document ejection port 162, reverses the document at a specific time point, and transports the document to the duplex path 163b. The reverse roller 169 also functions as an ejection roller to eject the document, of which the reading operation is completed, to the document ejection tray 162b.

In the reading path 163a, a gate sensor 173 to determine a reverse time point of the reverse roller 169 is mounted downstream of the second reading unit 140. If the gate sensor 173 detects that a rear end of the document passed, then the reverse roller 168 reverses the document after a predetermined time. A shutter 174 is mounted at a place where the duplex path 163b meets the reading path 163a. The shutter 174 is rotatably mounted to be maintained in a state in which the shutter is rotated downward by a weight thereof and guides the document reversed by the reverse roller 169 to the duplex path 163b. The shutter 174 is rotated upward by a document transporting force when the document is transported toward the document ejection port 162, thereby opening the reading path 163a.

The first reading unit 130 is mounted inside the reading frame 110 and a flat glass 111 and the first ADF glass 171 are mounted on the upper surface of the reading frame 110. The user can lay the documents on the flat glass 111 one by one in order to read the documents. The first reading unit 130 is moved along the flat glass 111 below the flat glass 111 to read the document laid on the flat glass 111, and is located below the first ADF glass 171 to read the image information recorded on the document transported by the automatic document feeder 160.

As illustrated in FIG. 3, the image reading apparatus 100 according to an embodiment of the present general inventive concept includes an input unit 181, a display unit 182, a first storage unit 183, and a second storage unit 184.

The input unit 181 inputs information on an operation of the image reading apparatus selected by the user to the control unit 150. The user can select a one-side reading operation or a both-side reading operation using the input unit 181.

The display unit 182 displays an operation state of the image reading apparatus 100 to the user. In the present embodiment, if a determination is made that the first reading unit 130 or the second reading unit 140 is not normally operated as the result of determining whether the first reading unit 130 and the second reading unit 140 are normally operated, then the control unit 150 displays a state thereof via the display unit 182 such that the user appropriately copes with the respective state.

The first storage unit 183 and the second storage unit 184 respectively store the image information of the document input from the first reading unit 130 and the second reading unit 140 and output the image information to the control unit 150 when a determination is made whether the reading units 130 and 140 are normally operated.

The control unit 150 compares the image information of the first side and the second side of the document read by the first reading unit 130 with the image information of the first side and the second side of the document read by the second reading unit 140, in order to determine whether the first reading unit 130 and the second reading unit 140 are normally operated.

If a determination is made that the image information of the first side of the document read by the first reading unit 130 is not identical to the image information of the first side of the document read by the second reading unit outside a predetermined error range, then the control unit 150 determines that any one of the reading units is not normally operated. Similarly, if a determination is made that the image information of the second side of the document read by the first reading unit 130 is not identical to the image information of the second side of the document read by the second reading unit 140, then a determination is made that any one of the reading units is not normally operated. Then, the control unit 150 displays this state via the display unit 182 to the user.

Figure 4A:
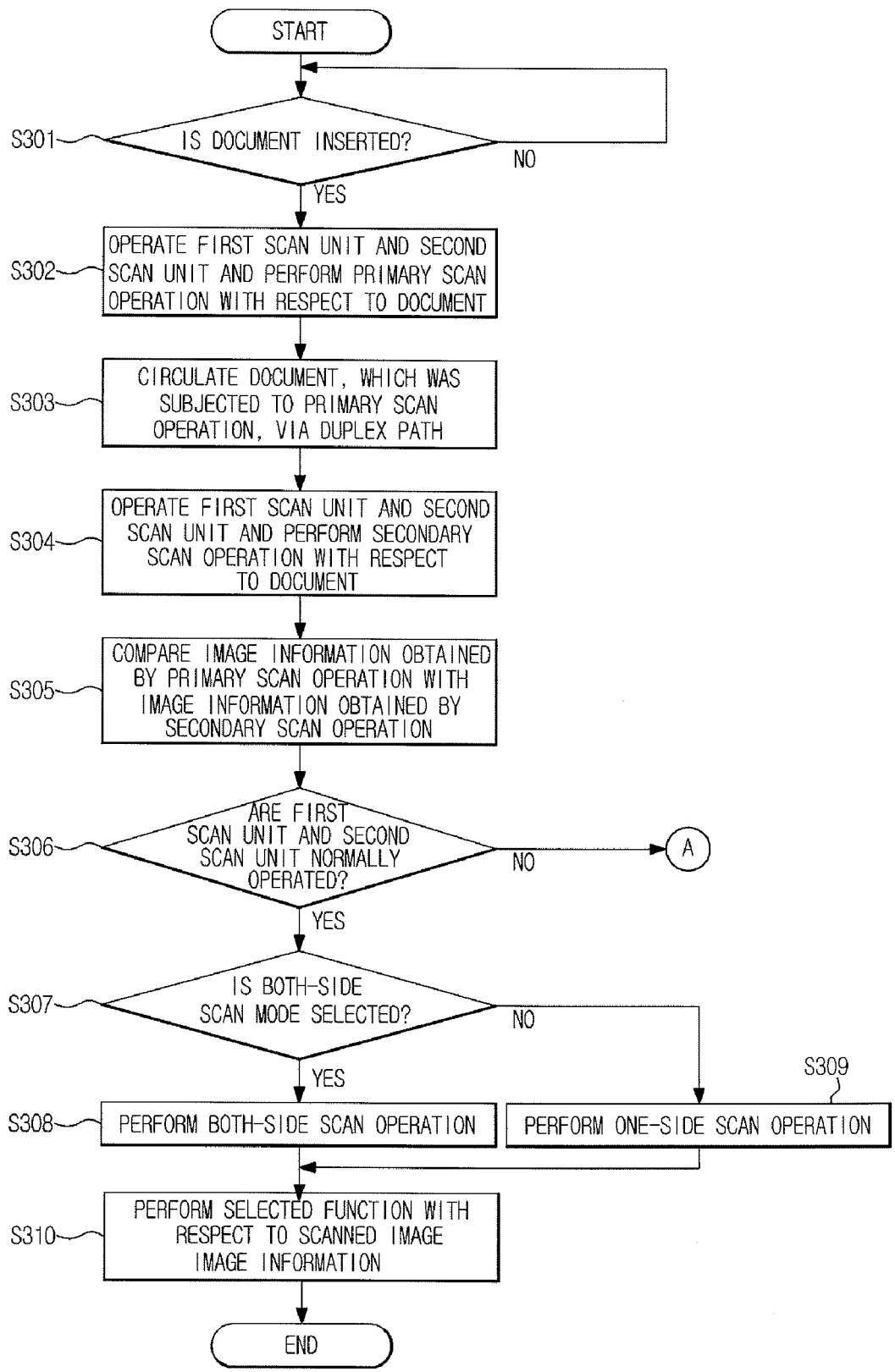
FIGS. 4A and 4B are flowcharts illustrating a method of controlling the image reading apparatus according to embodiments of the present general inventive concept.
Figure 4B:
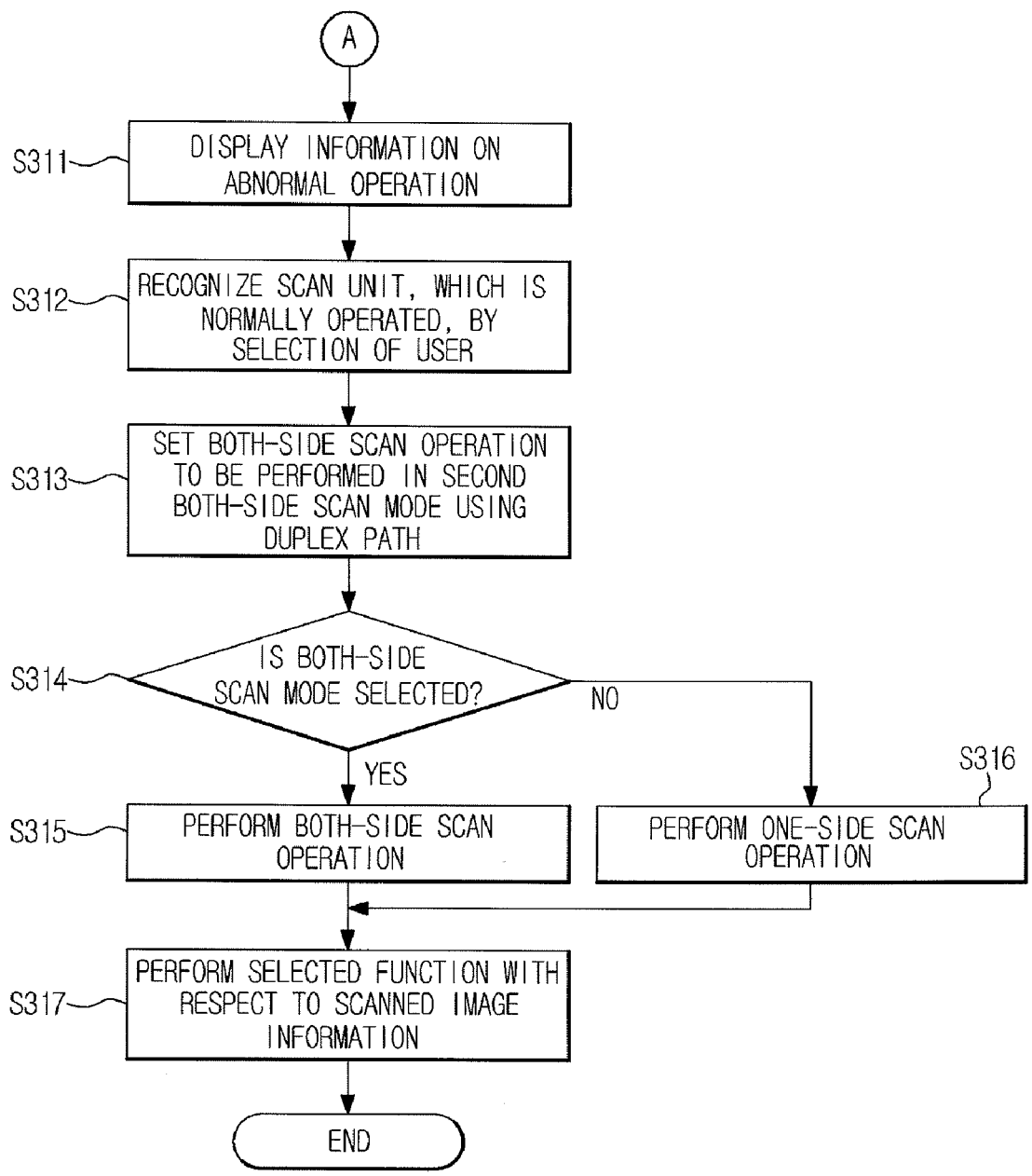

Hereinafter, a method of controlling the image reading apparatus according to an embodiment of the present general inventive concept will be described with reference to FIGS. 2 to 4. FIGS. 4A and 4B are flowcharts illustrating a method of controlling the image reading apparatus according to embodiments of the present general inventive concept.

When a power source of the image reading apparatus is turned on, the control unit 150 determines whether a document is inserted into the document insertion port 161 via a signal input from the document insertion detection sensor 161b (operation S301).

If a determination is made that the document is inserted, then the control unit 150 determines whether the first reading unit 130 and the second reading unit 140 are normally operated, before the document is read (operations S302 to S306).

First, the control unit 140 transports an uppermost document of the documents laid on the document feed tray 161a on the reading path 163a and performs the primary reading operation with respect to the document, in order to determine whether the first reading unit 130 and the second reading unit 140 are normally operated. More particularly, the control unit 150 operates the first reading unit 130 to read the first side of the document passing through the reading path 163a and operates the second reading unit 140 to read the second side of the document. At this time, the image information of the first side of the document read by the first reading unit 130 is stored in the first storage unit 183 and the image information of the second side of the document read by the second reading unit 140 is stored in the second storage unit 184 (operation S302).

If the rear end of the document, which was subjected to the primary reading operation, is detected by the gate sensor 173, then the control unit 150 reversely rotates the reverse roller 160 after the predetermined time. Then, the document is transported to the upstream side of the first reading unit 130 via the duplex path 163b to pass through the first reading unit 130 and the second reading unit 140 again. At this time, the document is in a state in which the first side and the second side thereof are reversed (operation S303).

When the document circulated via the duplex path 163b passes through the first reading unit 130 and the second reading unit 140 again, the control unit 150 performs the secondary reading operation with respect to the document using the first reading unit 130 and the second reading unit 140. At this time, the first reading unit 130 reads the second side of the document and the read image information is stored in the first storage unit 183. The second reading unit 140 reads the first side of the document and the read image information is stored in the second storage unit 184 (operation S304).

The control unit 150 reads the image information stored in the first storage unit 183 and the second storage unit 184, compares the image information obtained by the primary reading operation with the image information obtained by the secondary reading operation, and determines whether the first reading unit 130 and the second reading unit 140 are normally operated.

More particularly, the control unit 150 compares the image information of the first side of the document obtained by the first reading unit 130 in the primary reading operation with the image information of the first side of the document obtained by the second reading unit 140 in the secondary reading operation, and determines that any one of the first reading unit 130 and the second reading unit 140 is not normally operated if both of the image information are not identical to each other. Here, for example, since both of the image information are not identical to each other indicates that a difference between both of the image information is out of an allowable error range. That is, if both of the image information are slightly different from each other but the difference therebetween is within the allowable error range, it is considered that both of the image information are considered identical to each other.

The control unit 150 compares the image information of the second side of the document obtained by the second reading unit 140 in the primary reading operation with the image information of the second side of the document obtained by the first reading unit 130 in the secondary reading operation and determines that any one of the first reading unit 130 and the second reading unit 140 is not normally operated if both of the image information are not identical to each other (operations S305 and S306).

If a determination is made that both the first reading unit 130 and the second reading unit 140 are normally operated in Operation S306, then the control unit 150 determines whether a reading mode selected by the user is the both-side reading mode (operation S307).

If a determination is made that the user selects the both-side reading mode, then the control unit 150 drives the rollers 164, 165, 166, 167 and 168, sequentially transports the documents loaded on the document feed tray 161*a* and controls the first reading unit 130 and the second reading unit 140 to read the images recorded on the first side and the second side of the document transported along the reading path 163*a*. That is, the control unit 150 reads both sides of the document in the first both-side reading mode. The document, which was subjected to the both-side reading operation, is ejected to the document ejection tray 162*b* by the reverse roller 169 (operation S308).

Meanwhile, if a determination is made that the user does not select the both-side reading mode, the control unit 150 determines that the one-side reading mode is selected and controls the first reading unit 130 or the second reading unit 140 to read one side of the document. Any one of the reading units 130 and 140, which is used when performing the one-side reading operation, may be determined by a basic setting or the selection of the user (operation S309).

If the reading operation of Operation S308 or S309 is completed, then the control unit 150 controls the reading image information to be stored as a file or to be printed via the printing apparatus 200 by the selection of the user (operation S310).

If a determination is made that any one of the first reading unit 130 and the second reading unit 140 is not normally operated in Operation S306, then the control unit 150 displays the information on the abnormal state via the display unit 182 and informs the user of the abnormal state. At this time, the control unit 150 may display the image read by the first reading unit 130 and the image read by the second reading unit 140 and allow the user to select any one of the read images (operation S311).

When the user selects any one of the image read by the first reading unit and the image read by the second reading unit, the control unit 150 recognizes the reading unit, which reads the image selected by the user, as the reading unit which is normally operated (operation S312).

If the reading unit which is normally operated is recognized, then the control unit 150 sets the document to be read in the second both-side reading mode using the duplex path 163*b* at the time of the both-side reading operation (operation S313).

Next, the control unit 150 determines whether the reading mode selected by the user is the both-side reading mode (operation S314). If a determination is made that the both-side reading mode is selected, then the control unit 150 performs the both-side reading operation using only the reading unit which is determined to be normally operated in Operation S312. For example, if a determination is made that the first reading unit 130 is normally operated, then the control unit 150 controls only the first reading unit 130 to be operated and the second reading unit 140 to be not operated. Then, the first side of the document transported from the document feed tray 161*a* is read by the first reading unit 130. The document of which the first side was read is reversed by the reverse roller 169 and is transported to the first reading unit 130 again via the duplex path 163*b* and the second side of the document is read by the first reading unit 130. The document, which was subjected to the both-side reading operation, is ejected to the document ejection tray 162*b* by the reverse roller 169 which also functions as the ejection roller (operation S315).

Meanwhile, if a determination is made that the user does not select the both-side reading mode, then the control unit 150 determines that the one-side reading mode is selected and performs the one-side reading operation using only the reading unit which is determined to be normally operated in Operation S312. For example, if a determination is made that the first reading unit 130 is normally operated, then the control unit 150 controls only the first reading unit 130 to be operated and the second reading unit 140 to be not operated. At this time, the control unit 150 may instruct the user to lay the document on the document feed tray 161*a* so as to be suitably provided with respect to the first reading unit 130 (in a state in which a side to be read is directed upward) via the display unit 182. Then, the first side of the document transported from the document feed tray 161*a* is read by the first reading unit 130 and the document, which was subjected to the one-side reading operation, is ejected to the document ejection tray 162*b* (operation S316).

When the reading operation of Operation S315 or S316 is completed, the controller 150 controls the read image to be stored as a file or to be printed via the printing apparatus 200 by the selection of the user (operation S317).

Although, in the above description, an example of performing a process of determining whether the first reading unit 130 and the second reading unit 140 are normally operated (hereinafter, referred to as a malfunction detecting process) before reading the document was described, the user may be inquired whether the malfunction detecting process is performed before reading the document and then the malfunction detecting process may be performed or the document may be read without performing the malfunction detecting process by the selection of the user.

A determination may be made whether the malfunction detecting process is performed by setting a function once. In this case, the control unit 150 determines whether the user sets the malfunction detecting function, reads the document after the malfunction detecting process is performed if the malfunction detecting function is set, and reads the document without performing the malfunction detecting process if the malfunction detecting function is not set.

Before a command to read the document is input to the image reading apparatus, only the malfunction detecting process of determining whether the reading units 130 and 140 are normally operated may be performed.

As described above, according to various embodiments of the present general inventive concept, a determination is automatically made as to whether the first reading unit and the second reading unit are normally operated and the user is informed of the determined result, the user can rapidly cope with the malfunction or failure of the first reading unit and the second reading unit.

Since the both-side reading operation can be performed using only one reading unit via the duplex path, the both-side reading operation can be performed even when any one of the first and second reading units is not normally operated.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A non-transitory computer-readable recording medium having embodied thereon a computer program to execute a method, wherein the method comprises:
   receiving a reading command from a user;
   inquiring to the user whether to perform a malfunction detecting process of determining whether a first reading unit and a second reading unit are normally operated;
   receiving a command indicating whether to perform the malfunction detecting process; and
   controlling the first reading unit and the second reading unit to read a document.

2. An image reading apparatus, comprising:
   first and second reading units to respectively read first and second sides of a transported document;
   a duplex path to guide the document, which is read by the first reading unit and the second reading unit, to be transported to the first reading unit and the second reading unit again in a state in which the first side and the second side of the document are reversed; and
   a control unit, used for inquiring to the user whether to perform a malfunction detecting process of determining whether the first reading unit and the second reading unit are normally operated, to compare image information of the first and second sides of the document read by the first reading unit with image information of the first and second sides of the document read by the second reading unit
   and after determining whether the first reading unit and the second reading unit are normally operated, to control at least one of the first reading unit and the second reading unit to read the document based on the determination.

3. The image reading apparatus according to claim 2, wherein the control unit determines that at least one of the first reading unit and the second reading unit is not normally operated if the image information of the first side of the document obtained by the first reading unit is not identical to the image information of the first side of the document obtained by the second reading unit in a predetermined error range.

4. The image reading apparatus according to claim 2, wherein the control unit determines that at least one of the first reading unit and the second reading unit is not normally operated if the image information of the second side of the document obtained by the first reading unit is not identical to the image information of the second side of the document obtained by the second reading unit in a predetermined error range.

5. The image reading apparatus according to claim 2, wherein, if a determination is made that the first reading unit or the second reading unit is not normally operated, a both-side reading operation is performed using the duplex path.

6. The image reading apparatus according to claim 2, further comprising:
   a display unit to display an abnormal state of the first reading unit or the second reading unit if a determination is made that the first reading unit or the second reading unit is not normally operated.

7. A method of controlling an image reading apparatus including first and second reading units to respectively read first and second sides of a transported document, and a duplex path to guide the document, which is read by the first reading unit and the second reading unit, to be transported to the first reading unit and the second reading unit again in a state in which the first side and the second side of the document are reversed, the method comprising:
   performing a primary reading operation with respect to the document using the first reading unit and the second reading unit
   circulating the document via the duplex path;
   performing a secondary reading operation with respect to the document using the first reading unit and the second reading unit; and
   inquiring to the user whether to perform a malfunction detecting process of determining whether the first reading unit and the second reading unit are normally operated comparing image information obtained by the first reading unit and the second reading unit in the primary reading operation with image information obtained by the first reading unit and the second reading unit in the secondary reading operation and determining whether the first reading unit and the second reading unit are normally operated after determination whether the first reading unit and the second reading unit are normally operated, to control at least one of the first reading unit and the second reading unit to read the document based on the determination.

8. The method according to claim 7, wherein, if the image information of the first side of the document obtained by the first reading unit in the primary reading operation is not identical to the image information of the first side of the document obtained by the second reading unit in the secondary reading operation, a determination is made that at least one of the first reading unit and the second reading unit is not normally operated.

9. The method according to claim 7, wherein, if the image information of the second side of the document obtained by the second reading unit in the primary reading operation is not identical to the image information of the second side of the document obtained by the first reading unit in the secondary reading operation, a determination is made that at least one of the first reading unit and the second reading unit is not normally operated.

10. The method according to claim 7, wherein, if a determination is made that the first reading unit or the second reading unit is not normally operated, a both-side reading operation is performed using the duplex path.

11. The method according to claim 7, further comprising:
displaying information on an abnormal state if a determination is made that the first reading unit or the second reading unit is not normally operated;
determining a reading unit selected by a user to be a reading unit which is normally operated; and
switching a both-side reading mode using both the first reading unit and the second reading unit to a both-side reading mode using the duplex path.

12. A method of controlling an image reading apparatus including a first reading unit and a second reading unit, the method comprising:
receiving a reading command from a user;
inquiring to the user whether to perform a malfunction detecting process of determining whether the first reading unit and the second reading unit are normally operated;
receiving a command indicating whether to perform the malfunction detecting process; and
controlling the first reading unit and the second reading unit to read a document.

13. The method according to claim 12, wherein, if the command indicating that the malfunction detecting process is to be performed is received, the malfunction detecting process is performed before reading the document.

14. The method according to claim 13, further comprising:
performing a primary reading operation with respect to the document using the first reading unit and the second reading unit;
circulating the document via the duplex path such that first and second sides of the document are reversed;
performing a secondary reading operation with respect to the document using the first reading unit and the second reading unit; and
comparing image information obtained by the first reading unit and the second reading unit in the primary reading operation with image information obtained by the first reading unit and the second reading unit in the secondary reading operation and determining whether the first reading unit and the second reading unit are normally operated.

15. A method of controlling an image reading apparatus including first and second reading units to respectively read first and second sides of a document, and a duplex path to guide the document, which is read by the first reading unit and the second reading unit, to be transported to the first reading unit and the second reading unit again in a state in which the first side and the second side of the document are reversed, the method comprising:
receiving a command indicating whether to perform a malfunction detecting process of determining whether the first reading unit and the second reading unit are normally operated;
respectively reading the first side and the second side of the document using the first reading unit and the second reading unit; and
circulating the document via the duplex path and respectively reading the second side and the first side of the document using the first reading unit and the second reading unit.

16. The method according to claim 15, further comprising:
comparing image information of the first side and the second side of the document read by the first reading unit with image information of the first side and the second side of the document read by the second reading unit; and
determining whether the first reading unit and the second reading unit are normally operated.

17. A first reading unit to read at least one side of a document;
a second reading unit to read at least an other side of the document;
a first reading mode to use the first reading unit to read the one side of the document and the second reading unit to read the other side of the document;
a second reading mode to use one of the first and second reading units to read both sides of the document; and
a control unit, used for inquiring to the user whether to perform a malfunction detecting process of determining whether the first reading unit and the second reading unit are normally operated, to automatically detect a respective state of the first and second reading units and after detecting the respective state of the first and second reading units, to select and perform one of the first reading mode and the second reading mode based on the respective state detected
wherein the control unit detects the respective state of the first and second reading units by comparing image information of the both sides of the document read by the first reading unit with image information of the both sides of the document read by the second reading unit range.

18. The apparatus of claim 17, wherein:
the first reading mode is selected by the control unit when a normal state of the first and second reading units is detected; and
the second reading mode is selected by the control unit when an abnormal state of one of the first and second reading units is detected.

19. The apparatus of claim 18, wherein the one of the first and second reading units to read the both sides of the document in the second reading mode is detected to be in a normal state 20. An image reading method of an image forming apparatus having a first reading mode to read both sides of a document with a plurality of reading units and a second reading mode to read the both sides of the document with one reading unit, the image forming method comprising:
automatically detecting a respective state of the plurality of reading units; and after detecting the respective state of the first and second reading units, to select and perform selecting one of the first reading mode and the second reading mode based on the respective state of the reading units detected inquiring to the user whether to perform a malfunction detecting process of determining whether the first reading unit and the second reading unit are normally operated, wherein detecting the respective state of the first and second reading units comprises comparing image information of the both sides of the document read by one of the reading units with image information of the both sides of the document read by another of the reading units.

* * * * *